F. SALATHE, Jr.
INSULATING MATERIAL.
APPLICATION FILED AUG. 9, 1919.
1,427,230.
Patented Aug. 29, 1922.
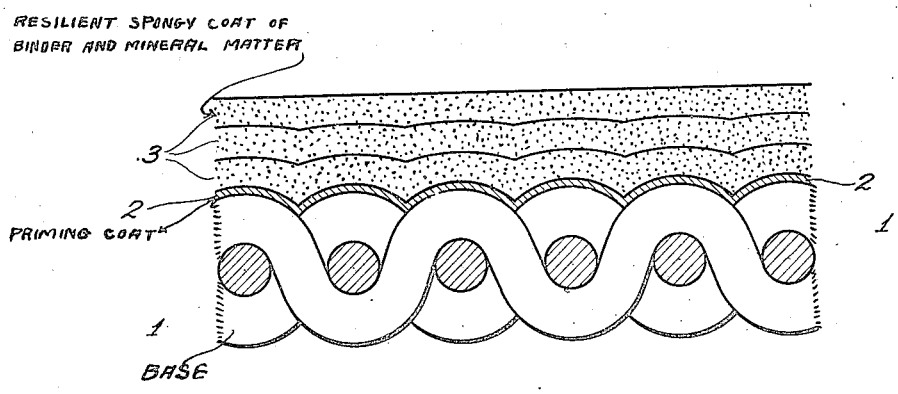

UNITED STATES PATENT OFFICE.

FREDERICK SALATHE, JR., OF SANTA BARBARA, CALIFORNIA.

INSULATING MATERIAL.

1,427,230. Specification of Letters Patent. Patented Aug. 29, 1922.

Application filed August 9, 1919. Serial No. 316,504.

*To all whom it may concern:*

Be it known that I, FREDERICK SALATHE, Jr., a citizen of the United States, and a resident of Santa Barbara, county of Santa Barbara, and State of California, have invented a certain new and useful Insulating Material, of which the following is a specification.

The invention relates to a heat insulating material comprising a non-fibrous material of more or less granular form so treated that it may be applied to a flexible base, and to means for so applying such material, and the objects of the invention are to produce a material which will be light in weight, coriaceous in appearance, flexible and pliant in character, having high insulating and heat resisting qualities, which is non-inflammable, which will not crack on bending, which is highly compressible, inexpensive to manufacture, which will be waterproof, which is capable of ornamentation, as by embossing, etc., and which will be more or less permeable to air.

These and further objects will more fully appear in the following specification and claims.

The drawing shows a greatly enlarged sectional view of the material, in which 1 designates a base, 2 a priming coat which may, if desired be dispensed with, and 3, 3 designates superposed layers of a mixture of a non-fibrous mineral and a binder.

Broadly the invention contemplates the employment of a non-fibrous material such, for example, as diatomaceous earth (sometimes called infusorial earth), so treated that it may be caused to adhere to a thin, flexible pliant base such as a textile fabric, paper, or the like.

In carrying out the invention virgin rubber (caoutchouc) is "broken down" as by methods well known in rubber working. The breaking down process is preferably not carried out to the same extent as in the general practise. The rubber in its more or less inelastic condition is dissolved in a solvent, preferably a highly volatile hydrocarbon such as gasoline, until it reaches the consistency of a thick fluid.

A quantity of a non-fibrous earthy material is first thoroughly dried, and then wetted, preferably with the rubber solvent, to form the mass into a thick paste. To the paste is added a relatively small quantity of the dissolved rubber and the combined mass is thoroughly mixed. During the mixing air under compression is forced into the mass. The air will make the mixture a more or less spongy mass and air bubbles will be formed in the rubber. The air bubbles formed in the rubber are microscopic in character. The mass is preferably of such a consistency that it may be easily spread.

A base of textile fabric, for example, is given a thin priming coat of rubber cement. A thin layer or film of the spongy mass of rubber and earthy material is spread on the base. The spreading may be effected by means of apparatus such as is used for forming sheets in the manufacture of rubber. Preferably a plurality of films of the material are applied to the base. Each layer of the material is partially dried before the next is applied. As the rubber reaches its ultimate dryness it will resume its elastic condition and the microscopic bubbles will be imprisoned in the rubber in what may be termed a permanent froth, or the binder may be of a honeycomb character resembling the well-known sponge rubber with the earthy particles adhering to the walls.

As the drying is effected by the volatilization of the rubber solvent, the latter may be recovered by known means.

Before or after the drying the sheet may be lightly rolled or pressed to increase the density and to force the coating, or a portion of it, into the interstices of the base.

If desired a vulcanizing medium may be compounded with the rubber during the "breaking down" operation as is common. After the material is spread upon the fabric the rubber may be vulcanized.

Coloring matter may be incorporated in the mass at any time before it is spread on the base, or fibrous material in finely divided form, as flock, asbestos or the like may be mixed with the material if desired. Any material in finely divided form may be dusted on the treated surface of the base and caused to adhere to the coating as by being rolled or pressed into the same.

After drying the coated surface may be ornamented as by embossing or stamping.

The sheet thus formed may be bent or folded in any manner and to any degree without breaking or cracking the coating. If the sheet be stretched the coating will stretch with it, and the coating will tend to restore the sheet to its normal dimensions when the strain is released. When the sheet is stitched the punctures made by the needle will tend to close and form tight joints around the threads.

The coating resembles leather in appearance, feel and texture, and the material, when the base is a textile fabric, is permeable in a degree somewhat lower than leather, and will permit of a certain amount of ventilation.

It is to be understood that the invention is not limited to rubber as a binder for the non-fibrous earthy material but any material having the proper quality of adhesion, and which will permeate the earthy mass, may be used.

The amount of binder, when rubber is employed, is small. In the preferred embodiment the rubber content should be no higher than approximately 25% by weight of the diatomaceous earth in the completed structure.

The preferred textile base is a light cotton drill or twill, and with such a material, body coverings of light weight and great warmth may be produced. With a lighter base or one of paper, wall coverings having high insulating, and water and fireproof qualities, which may be washed down, and which are capable of ornamentation by printing, embossing or otherwise may be produced. By using a heavier or stronger base such as a heavy bagging or woven wire fabric an extremely rugged structure capable of use for a variety of purposes may be secured.

It is to be understood that the insulating coating may be applied to one or both sides of the base, and that the base may be sized with material other than rubber cement, or the sizing may be omitted as desired.

It is also to be understood that the mixture of diatomaceous earth and binder may be made into sheets and be subsequently applied to the base if desired.

It is to be further understood that the amount of the mineral substance employed is greatly in excess of that of the binder, and the latter is employed solely as a binder for securing the particles together and to the base when employed. It is desirable that the quantity of binder be as small as possible as compared to the mineral whereby the insulating qualities of the latter may be taken advantage of.

If desired gas other than air may be injected into the mass for forming the binder into a spongy or frothy mass.

The diatomaceous earth which occurs in southern California has been found particularly suitable for use in the invention of this application, but it is believed that material from other sources may be employed.

In accordance with the provisions of the patent statutes the principle of the invention has been described together with what is now considered to be the best embodiment thereof, but it is to be understood that the invention is not limited to the embodiment described but may be carried out in other ways.

Having described the invention what is claimed and desired to be secured by Letters Patent, is—

1. An insulating material, comprising a non-fibrous mineral in finely divided form, and a resilient air infiltrated binder, the mineral being greatly in excess of the binder.

2. An insulating material, comprising a non-fibrous mineral in finely divided form, and a resilient spongy binder, the mineral being greatly in excess of the binder.

3. An insulating material, comprising a non-fibrous mineral in finely divided form, and a pliant resilient spongy binder, the mineral being greatly in excess of the binder.

4. An insulating material, comprising diatomaceous earth in finely divided form, and a spongy pliant binder, the diatomaceous earth being greatly in excess of the binder.

5. An insulating material, comprising diatomaceous earth in finely divided form, and a spongy rubber binder, the diatomaceous earth being greatly in excess of the binder.

6. An insulating material, comprising diatomaceous earth in finely divided form, and an air infiltrated binder, the diatomaceous earth being greatly in excess of the binder.

7. An insulating material, comprising diatomaceous earth in finely divided form, and an air infiltrated rubber binder, the diatomaceous earth being greatly in excess of the binder.

8. An insulating material, comprising a base, a coating carried by the base, said coating comprising a non-fibrous mineral and a resilient spongy binder, said mineral being greatly in excess of the binder.

9. An insulating material, comprising a pliable base, a coating carried by the base, said coating comprising diatomaceous earth and rubber, the diatomaceous earth being greatly in excess of the rubber.

10. An insulating material, comprising a textile fabric, a coating carried by the fabric, said coating comprising diatomaceous earth and rubber, the diatomaceous earth being greatly in excess of the rubber, and said earth being air infiltrated.

11. An insulating material, comprising a base, a coating carried by the base, said coating comprising a non-fibrous mineral, and a resilient air infiltrated binder, the mineral being greatly in excess of the binder.

This specification signed and witnessed this 19th day of June, 1919.

FREDERICK SALATHE, JR.

Witnesses:
A. E. RENTON,
C. C. COLING.